(No Model.)
K. MOSCICKI.
VALVE GEAR FOR ENGINES.
No. 546,770. Patented Sept. 24, 1895.
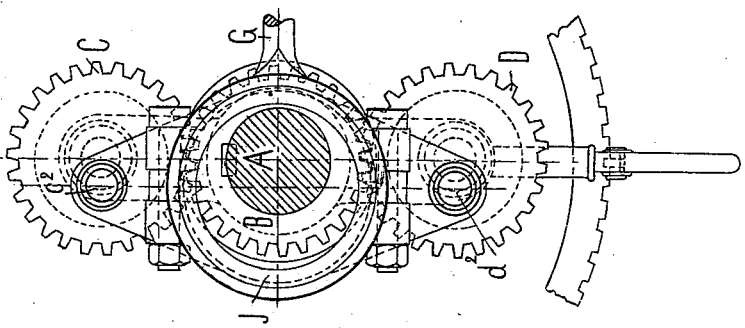
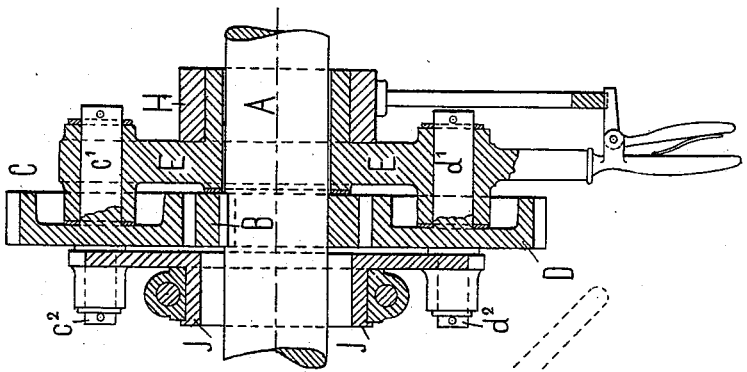
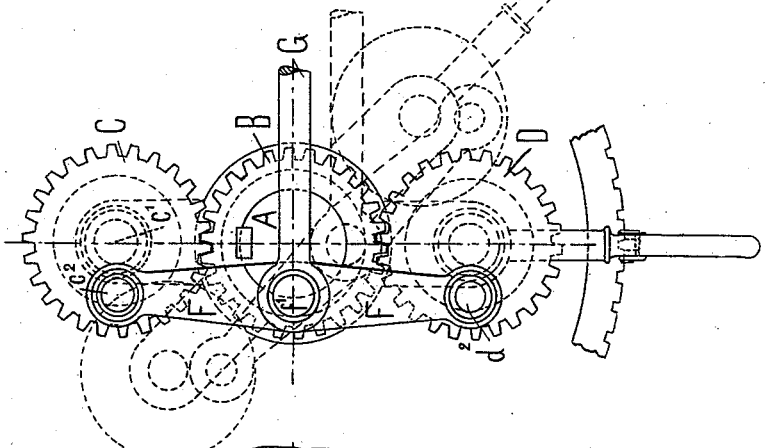
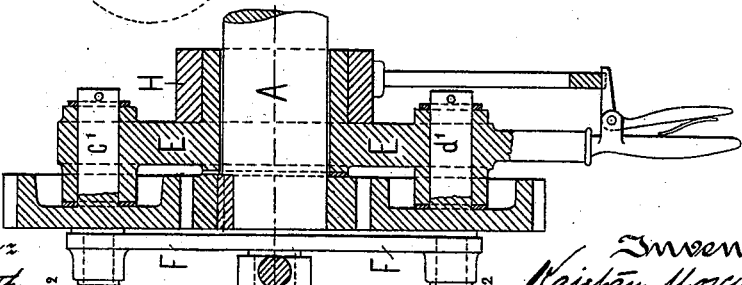

UNITED STATES PATENT OFFICE.

KAJETAN MOSCICKI, OF WARSAW, RUSSIA.

VALVE-GEAR FOR ENGINES.

SPECIFICATION forming part of Letters Patent No. 546,770, dated September 24, 1895.

Application filed January 31, 1895. Serial No. 536,769. (No model.)

*To all whom it may concern:*

Be it known that I, KAJETAN MOSCICKI, a subject of the Czar of Russia, residing at Warsaw, Poland, Russia, have invented certain new and useful Improvements in Valve-Gear for Steam and other Engines, of which the following is a specification.

My invention has relation to steam and other engines, and in such connection it relates particularly to a valve-gear adapted to regulate the expansion of an elastic fluid or liquid in the engine and also the direction of motion or rotation of the engine.

Hitherto the simplest and most convenient devices for opening and closing the inlet and outlet ports of the engine have been what are known as "slides" of different constructions operated by eccentrics connected with a shaft, but such a mechanism depended for a change in the expansion as well as direction of rotation of the engine entirely upon a change of the angle of inclination of the eccentrics of the shaft of the engine. It is absolutely necessary that it should be possible to regulate the engine at will and at any time and to change the angle of inclination of the eccentrics thereof during operation of the same. This result in the known types of engines is attained by different connecting-links, which, notwithstanding their complications, do not perform their functions with any degree of accuracy or perfection.

The principal object of my invention is to provide a controller for an engine of simple and effective action and in which changes in the expansion of the elastic fluid or gases of the engine are under absolute control, as well as the direction of rotation of movable parts of the engine during the operation of the engine.

My invention consists of a controller for a steam or other engine constructed and arranged in the manner hereinafter described and claimed.

The nature and scope of my invention will be more fully understood from the following description, taken in connection with the accompanying drawings, forming part hereof, and in which—

Figure 1 is a vertical section through a controller embodying features of my invention for a certain hereinafter specified purpose. Fig. 2 is a front elevational view of the same. Fig. 3 is a vertical section through a modified form thereof for other defined purposes; and Fig. 4 is a view, partly in section and partly in end elevation, of the construction of mechanism of my invention as illustrated in Fig. 3.

Referring to the drawings, A is the driven shaft of the engine, to which is rigidly secured a gear-wheel B, meshing with two other gear-wheels C and D, having motion imparted thereto from the gear-wheel B of the driven shaft A. The shafts $c'$ and $d'$ of the gear-wheels C and D are carried by a lever E, having a certain range of rotary movement on the shaft A. The diameter of the gear-wheels depends upon requirements of the engine. If, for instance, the eccentrics are required to make a certain number of revolutions corresponding to the number of revolutions of the driven shaft A, it will be necessary to make the diameter of said wheels C and D equal to the diameter of the gear-wheel B; but, on the other hand, if one revolution of the eccentric is to equal two revolutions of the shaft A—for instance, in the case of the employment of said controller in connection with gas-engines—the diameter of said gear-wheels C and D must be twice as great as the said gear-wheel B. The gear-wheels C and D are provided with bolts $c^2$ and $d^2$, which are connected with one another by means of an arm F, having a centrally-arranged bolt journal-pin $f'$, forming a connection with the rod G of a slide-valve. It will be readily understood in connection with Fig. 2 of the drawings that the bolt $f'$ describes a half-circle, which is equal to those of the bolts $c'$ and $c^2$. If the lever E is secured at a certain angle, that which is described by the gear-wheels C and D, having the same diameter as the gear-wheel D, will be made twice the size and the eccentric $f'$ therefor will describe the same angle. Since all the possible and necessary positions of the slide-valve are obtained by a rotation of the eccentric at one hundred and eighty degrees, the lever E therefor will only be allowed to have a rotary movement of ninety degrees, in order to prevent any friction on the shaft A by the movement of the lever E. The axle of said lever will be carried by a bracket H. It may be here remarked that the axle of said bracket is in alignment with that of the shaft A. The rotary movement of the lever E is obtainable by a hand action or by means of the governor of the engine. The mechanism hereinbefore described is employed only when located at the end of the shaft A. In many instances, however, the shaft of the engine will be caused to pass through the eccentric. In such case it will be necessary to change the construction of the mechanism in the manner illustrated in Figs. 3 and 4. This mechanism differs from that hereinbefore described in that the rod of the slide-valve, instead of being connected by a bolt or journal-pin $f'$ with the arm F, is provided with a ring $i$, having a sufficient diameter to prevent by its movements any hinderance through the shaft A. If the controller consists of two rods and slide-valves, one of them is the ground slide-valve and the other the dividing slide-valve, and when so used it is necessary in order to operate both of them to provide each with mechanism such as above described; but if a change in the direction of rotation of the machine is not necessary, one of said mechanisms will be sufficient for the intended purposes.

The advantages derived by the use of the described mechanisms are, first, effective action due to simplicity of parts of the mechanism and reduction of friction to a minimum, and, second, the entire reliability in the regulation of the engine and the observance of the eccentric or eccentrics at all times, and with the reduction of friction upon the parts, whereby little or no wear upon the engine is entailed, and thus the life of the same much prolonged and far better continuous working insured.

Having thus described the nature and objects of my invention, what I claim as new, and desire to secure by Letters Patent, is—

1. A controller for steam and other engines, comprising a gear wheel mounted on the main driving shaft, two eccentric gear wheels meshing with the gear wheel on the driving shaft, a lever rotating on the driving shaft and carrying the two eccentric gear wheels, a valve rod secured eccentrically to said eccentric gear wheels and driven thereby to operate and reciprocate a valve, substantially as and for the purposes set forth.

2. A controller for steam and other engines, comprising a gear-wheel mounted on the main driving shaft, two eccentric gear wheels meshing with the gear wheel of the driving shaft, a lever rotating on the driving shaft and carrying the eccentric gear wheels, a link pivoted eccentrically to both eccentric gear wheels and a valve rod journaled to the middle of said link, substantially as and for the purposes set forth.

In testimony whereof I have hereunto set my signature in the presence of two subscribing witnesses.

KAJETAN MOSCICKI.

Witnesses:
K. BOYELEZ,
WACTARO PODVENSKI.